United States Patent
Serov et al.

(10) Patent No.: US 9,502,719 B2
(45) Date of Patent: Nov. 22, 2016

(54) CATHODE CATALYSTS FOR FUEL CELL APPLICATION DERIVED FROM POLYMER PRECURSORS

(75) Inventors: Alexey Serov, Albuquerque, NM (US); Barr Halevi, Albuquerque, NM (US); Michael Robson, Albuquerque, NM (US); Wendy Patterson, Albuquerque, NM (US); Kateryna Artyushkova, Albuquerque, NM (US); Plamen B Atanassov, Santa Fe, NM (US)

(73) Assignee: STC.UNM, Albuquerque, NM (US)

( * ) Notice: Subject to any disclaimer, the term of this patent is extended or adjusted under 35 U.S.C. 154(b) by 0 days.

(21) Appl. No.: 14/126,565

(22) PCT Filed: Jun. 15, 2012

(86) PCT No.: PCT/US2012/042593
§ 371 (c)(1),
(2), (4) Date: Apr. 9, 2015

(87) PCT Pub. No.: WO2012/174335
PCT Pub. Date: Dec. 20, 2012

(65) Prior Publication Data
US 2015/0295248 A1    Oct. 15, 2015

Related U.S. Application Data
(60) Provisional application No. 61/497,434, filed on Jun. 15, 2011.

(51) Int. Cl.
*B01J 27/00* (2006.01)
*B01J 27/24* (2006.01)
(Continued)

(52) U.S. Cl.
CPC ............. *H01M 4/9091* (2013.01); *H01M 4/90* (2013.01); *H01M 2004/8689* (2013.01); *Y02E 60/50* (2013.01)

(58) Field of Classification Search
CPC ...... H01M 4/9091; H01M 4/90; B01J 27/00; B01J 27/24; B01J 31/0235; B01J 37/082; B01J 20/3057
USPC ....... 502/167, 304, 325, 331, 337, 338, 319, 502/321, 343, 350, 353
See application file for complete search history.

(56) References Cited

U.S. PATENT DOCUMENTS 6,372,981 B1    4/2002  Ueda et al.
7,678,728 B2    3/2010  Olson et al.
(Continued)

FOREIGN PATENT DOCUMENTS

| WO | WO 2012174335 A2 * | 12/2012 | ............ H01M 4/90 |
| WO | WO 2013116754 A1 * | 8/2013 | ............ B01J 37/08 |

OTHER PUBLICATIONS

Gang Wu et al., High Performance Electrocatalysts for Oxygen Reduction Derived from Polyaniline, Iron, and Cobalt, Science, vol. 33, pp. 443-447, Apr. 22, 2011.
(Continued)

*Primary Examiner* — Patricia L Hailey
(74) *Attorney, Agent, or Firm* — Gonzales Patent Services; Ellen M. Gonzales (57) ABSTRACT

A method of preparing M-N—C catalysts utilizing a sacrificial support approach and inexpensive and readily available polymer precursors as the source of nitrogen and carbon is disclosed. Exemplary polymer precursors include those that do not form complexes with iron, but which do complex with silica, for example, polyetheleneimine (PEI), Poly(2-ethyl-2-oxazoline), Poly(acrylamide-co-diallyldimethylammonium chloride), Poly(melamine-co-formaldehyde), Poly[[6-[(1,1,3,3-tetramethylbutyl)amino]-s-triazine-2,4-diyl]-[(2,2,6,6-tetramethyl-4-piperidyl)imino]-hexamethylene-[(2,2,6,6-tetramethyl-4-piperidyl)imino] and the like.

20 Claims, 8 Drawing Sheets

(51) Int. Cl.
*H01M 4/90* (2006.01)
*H01M 4/86* (2006.01)

(56) References Cited

U.S. PATENT DOCUMENTS

| | | |
|---|---|---|
| 2005/0079374 A1 | 4/2005 | Asai et al. |
| 2010/0167106 A1* | 7/2010 | Pak ............ H01M 4/8814 429/525 |
| 2011/0287174 A1 | 11/2011 | Calabrese Barton |
| 2012/0077667 A1* | 3/2012 | Liu ............ H01M 4/8605 502/101 |
| 2012/0219735 A1 | 8/2012 | Bakker |
| 2014/0349843 A1* | 11/2014 | Patterson ........ H01M 4/9041 502/182 |

OTHER PUBLICATIONS

Frederick Jaouen et al., Recent advances in non-precious metal catalysis for oxygen-reduction reaction in polymer electrolyte fuel cells, Energy & Environmental Science, vol. 4 pp. 114-130, Oct. 18, 2010.

Garsuch et al., Fuel Cell Studies on a Non-Noble Metal Catalyst Prepared by a Template Assisted Synthesis Route Journal of The Electrochemical Society, vol. 155, No. 9 Jul. 18, 2008.

Atanassov et al Non-platinum Electrocatalysts for Polymer Electrolyte Fuel Cells, The Electrochemical Society, Inc., 205th Meeting, Abs. 205, 2004.

* cited by examiner

CATHODE CATALYSTS FOR FUEL CELL APPLICATION DERIVED FROM POLYMER PRECURSORS

CROSS-REFERENCE TO RELATED APPLICATIONS

The following application is a 371 of international PCT application PCT/US1242539, filed Jun. 15, 2012, which claims the benefit of U.S. Provisional Application No. 61/497,434, filed Jun. 15, 2011, each of which is hereby incorporated by reference in its entirety.

STATEMENT REGARDING GOVERNMENT SPONSORED RESEARCH

This invention was made with Government support under Grant No. 2RQ83 awarded by the DOE-EERE. The U.S. Government has certain rights in this invention.

BACKGROUND

Fuel cells are receiving increasing attention as a viable energy-alternative. In general, fuel cells convert electro-chemical energy into electrical energy in an environmentally clean and efficient manner. Fuel cells are contemplated as potential energy sources for everything from small electronics to cars and homes. In order to meet different energy requirements, there are a number of different types of fuel cells in existence today, each with varying chemistries, requirements, and uses.

As one example, Direct Methanol Fuel Cells (DMFCs) rely upon the oxidation of methanol on an electrocatalyst layer to form carbon dioxide. Water is consumed at the anode and produced at the cathode. Positive ions (H+) are transported across a proton exchange membrane to the cathode where they react with oxygen to produce water. Electrons can then be transported via an external circuit from anode to cathode providing power to external sources.

As another example, polymer electrolyte membrane (PEM) fuel cells (also called proton exchange membrane fuel cells) use pure hydrogen (typically supplied by a hydrogen tank) as a fuel. A stream of hydrogen is delivered to the anode side of a membrane-electrode assembly (MEA), where it is catalytically split into protons and electrons. As with the DMFC, the positive ions are transported across a proton exchange membrane to the cathode where they react with oxygen to produce water.

Currently, one of the limiting factors in the wide scale commercialization of PEM and DMFC fuel cells is the cost associated with precious metals. Both DMFC and PEM fuel cells commonly use platinum as an electrocatalyst. Nobel metals such as platinum are needed to catalyze the sluggish oxygen reduction reaction (ORR) at the cathode. One of the major routes to overcome this limitation is to increase the platinum utilization in noble-metal based electrocatalysts. Another viable route is to use a less expensive, yet still sufficiently active catalyst in larger quantities. Several classes of non-platinum electrocatalysts have been identified as having adequate oxygen reduction activity to be considered as potential electrocatalysts in commercial fuel cell applications.

Generally, known non-platinum electrocatalysts are supported on high surface area carbon blacks. This is done to increase dispersion, active surface area, and conductivity of the catalytic layer. The synthesis procedure usually includes precipitation of the precursor molecules onto the supporting substrate and pyrolyzation of the supported precursor.

M-N—C catalysts have been found to be very promising for electrochemical oxygen reduction applications in fuel cell membrane electrode assemblies (MEAs), stacks and fuel cell systems. Critical aspects of the materials include the presence of metallic particles, conjugated carbon-nitrogen-oxide-metallic networks, and nitrogen-bonded carbon. The metallic phase includes metallic, oxide, carbide, nitride, and mixtures of these states. The chemical states and bonding of the N/C/M networks and N/C networks influences performance, for example, increased overall nitrogen content improves ORR performance. However, these systems still suffer from several significant drawbacks including: low stability in acidic environments, low durability in acid and alkaline environments, high costs of nitrogen precursors and low activity in ORR compared with platinum. The problem of low stability in acid is connected to leaching of metal from carbon-nitrogen network. Low durability in acid and alkaline solutions is explained by the evolution of significant amount of $H_2O_2$ in these environments which is corrosive for both metal and carbon-nitrogen networks. The low activity is possibly due to the low metal loading, and as a result in low concentration of active sites in such catalysts due to using external carbon source (high surface carbons like Vulcan, KetjenBlack etc).

A previously described pyrolysis-based methods for synthesizing unsupported M-N—C catalysts that overcame a number of the problems identified above involved templating a nitrogen and carbon containing polymer that is known to form complexes with iron and transition metals (such as iron) on a sacrificial support such as silica, pyrolyzing the templated support, and then removing the support, for example via etching. See e.g., U.S. Pat. No. 7,678,728 issued Mar. 15, 2010, which is hereby incorporated by reference.

SUMMARY

The M-N—C systems are known catalysts for oxygen reduction reaction (ORR). However, they possess a number of significant disadvantages including: low stability in acid media, low activity compared to conventional ORR catalyst (platinum), and high cost of precursors. In the present disclosure a method of preparation of M-N—C catalysts utilizing a sacrificial support approach and using inexpensive and readily available polymer precursors is described. The synthesized catalysts made using this approach perform well in both alkaline and acid media are highly durable, and inexpensive to manufacture.

DETAILED DESCRIPTION

According to an embodiment the present disclosure provides novel catalysts and methods for making the same. The present disclosure relies on the surprising and unexpected discovery that M-N—C catalysts can be synthesized by using polymers, such as polyetheleneimine (PEI), that are known to not form complexes with iron, but which do complex with silica, as the source of nitrogen and carbon. PEI does not form complexes with iron, but due to its strong positive charge, is able to form a complex-like structure with negative charged silica material. In an unanticipated result, the use of PEI produces a greatly desired even distribution of active sites in the resulting catalytic material. Examples of suitable silica-complexing polymers include, but are not necessarily limited to nitrogen containing electrolytes such as Poly(2-ethyl-2-oxazoline), Poly(acrylamide-co-diallyldimethylammonium chloride), Poly(melamine-co-formaldehyde), Poly[[6-[(1,1,3,3-tetramethylbutyl)amino]-s-triazine-2,4-diyl]-[(2,2,6,6-tetramethyl-4-piperidyl)imino]-hexamethylene-[(2,2,6,6-tetramethyl-4-piperidyl)imino]
and the like. Typically, these are strong positively charged electrolytes have a branched or graphite-like structure, and have a strong affinity to negatively charged groups of silica materials.

According to a specific embodiment, an exemplary M-N—C catalyst was prepared via wet impregnation of iron precursors in the form of iron nitrate and C—N precursors in the form of PEI onto the surface of a sacrificial support of fumed silica. Other suitable iron precursors include, but are not limited to iron sulfate, iron acetate, iron chloride, and the like.

According to a specific embodiment, Fe-PEI catalysts were prepared via wet impregnation of iron and PEI precursors onto the surface of fumed silica (Cab-O-Sil™ EH-5, surface area: ~400 m$^2$ g$^{-1}$). First, 1 g of silica was dispersed in water using the sonobath. Then, a solution of 1 g of PEI in water was added to silica, and sonicated for 20 minutes, making a complex-like structure with silica. Then, an aqueous solution of 1 g iron nitrate (Fe(NO$_3$)$_3$.9H$_2$O, Sigma-Aldrich) was added to the SiO2-PEI solution and then sonicated for 8 hours in the sonobath. After sonication, a viscous solution of silica and Fe-PEI was dried overnight at T=85° C. The solid was ground to a fine powder in an agate mortar, and then subjected to the heat treatment (HT). The conditions of HT were: UHP N$_2$ atmosphere flowing at a rate of 100 cc min$^{-1}$, HT temperatures of 800° C., HT temperature ramp rates of 10° C. min$^{-1}$, and HT durations of 1 hour. After heat treatment silica material was removed by means of HF 15 wt %.

According to another specific embodiment, Fe-Poly(2-ethyl-2-oxazoline) catalysts were prepared via wet impregnation of iron and Poly(2-ethyl-2-oxazoline) precursors onto the surface of fumed silica (Cab-O-Sil™ EH-5, surface area: ~400 m$^2$ g$^{-1}$). First, 3 g of silica was dispersed in water using the sonobath. Then, a solution of 10 g of Poly(2-ethyl-2-oxazoline) in water was added to the silica, and sonicated for 20 minutes, making a complex-like structure with silica. Then, an aqueous solution of 0.6 g iron nitrate (Fe(NO$_3$)$_3$.9H$_2$O, Sigma-Aldrich) was added to the SiO2-Poly(2-ethyl-2-oxazoline) solution and then sonicated for 8 hours in the sonobath. After sonication, a viscous solution of silica and Fe-Poly(2-ethyl-2-oxazoline) was dried overnight at T=85° C. The solid was ground to a fine powder in an agate mortar, and then subjected to the heat treatment (HT). The conditions of HT were: UHP N$_2$ atmosphere flowing at a rate of 100 cc min$^{-1}$, HT temperatures of 800° C., HT temperature ramp rates of 10° C. min$^{-1}$, and HT durations of 1 hour. After heat treatment silica material was removed by means of HF 15 wt %.

It will be appreciated that other transition metals such as Ce, Cr, Cu Mo, Ni, Ru, Ta, Ti, V, W, and Zr can be substituted in place of iron, by simply using precursors of those metals instead. Examplary transition metal precursors include, but are not limited to cerium nitrate, chromium nitrate, copper nitrate, ammonium molybdate, nickel nitrate, ruthenium chloride, tantalum isopropoxide, titanium ethoxide, vanadium sulfate, ammonium tunstanate and zirconium nitrate, and the like.

According to another specific embodiment, Co-PEI catalysts were prepared via wet impregnation of cobalt and PEI precursors onto the surface of fumed silica (Cab-O-Sil™ EH-5, surface area: ~400 m$^2$ g$^{-1}$). First, 1.6 g of silica was dispersed in water using the sonobath. Then, a solution of 2.3 g of PEI in water was added to silica, and sonicated for 25 minutes, making a complex-like structure with silica. Then, an aqueous solution of 1 g cobalt nitrate (Co(NO$_3$)$_2$.6H2O, Sigma-Aldrich) was added to the SiO$_2$-PEI solution and then sonicated for 8 hours in the sonobath. After sonication, a viscous solution of silica and Co-PEI was dried overnight at T=85° C. The solid was ground to a fine powder in an agate mortar, and then subjected to the heat treatment (HT). The conditions of HT were: UHP N$_2$ atmosphere flowing at a rate of 100 cc min$^{-1}$, HT temperatures of 800° C., HT temperature ramp rates of 10° C. min-1, and HT durations of 1 hour. After heat treatment silica material was removed by means of HF 15 wt %.

It will be appreciated that some in some applications a mono-metallic catalyst may not be sufficiently stable or active to replace traditional platinum- or platinum alloy-based catalysts. Accordingly, as indicated above, according to some embodiments, the presently described method may incorporate the use of precursors of multiple metals in order to achieve a desired stability and/or activity.

Suitable sacrificial supports include, but are not limited to silicas, zeolites, metal organic frameworks (MOFs), aluminas, and the like. The support may take the form of spheres, particles, or other two or three dimensional regular, irregular, or amorphous shapes. The spheres, particles, or other shapes may be monodisperse, or irregularly sized. The spheres, particles, or other shapes may or may not have pores and such pores may be of the same or different sizes and shapes.

It should be appreciated that the size and shape of the silica particles may be selected according to the desired shape(s) and size(s) of the voids within the electrocatalyst material. Accordingly, by selecting the particular size and shape of silica particles, one can produce a electrocatalyst having voids of a predictable size and shape. For example, if the silica particles are spheres, the electrocatalyst will contain a plurality of spherical voids. Those of skill in the art will be familiar with the electrocatalyst Pt—Ru black, which consists of a plurality of platinum-ruthenium alloy spheres. An electrocatalyst formed from using silica spheres with the above-described method looks like a negative image of the Pt—Ru black; the space that existed as a void in the Pt—Ru black is filled with metal electrocatalyst, and the space that existed as metal electrocatalyst in the Pt—Ru black is void.

As stated above, according to some embodiments, silica spheres of any diameter may be used. In some preferred embodiments, silica particles having a characteristic length of between 1 nm and 100 nm, in more preferred embodiments, silica particles having an characteristic lengths of between 100 nm and 1000 nm may be used and in other preferred embodiments, silica particles having an characteristic lengths of between 1 mm and 10 mm may be used. Further mesoporous silica can also be used in the templating synthesis approach (SSM). In this case the templating involves intercalating the mesopores of the material and results in a self-supported electrocatalysts with porosity in the 2-20 nm range. In one particular embodiment, the silica template is Cabosil amorphous fumed silica (325 m$^2$/g). As stated above, because the spheres serve as the template for the formation of the electrocatalyst, in an embodiment where silica particles having an average diameter of 20 nm is used, the spherical voids in the electrocatalyst will typically have a diameter of approximately 20 nm. Those of skill in the art will be familiar with a variety of silica particles that are commercially available, and such particles may be used. Alternatively, known methods of forming silica particles may be employed in order to obtain particles of the desired shape and/or size.

As described above, sacrificial supports of different sizes and shapes may be used together to produce catalysts having a variety of different morphologies. For example, in some embodiments it may be desirable to produce catalysts having multi-modal porosity, that is, where the catalyst comprises two or more distinct populations of pores, wherein each population consists of pores having an average diameter that is differentiable from the other population(s). For example, a catalyst that has one population of pores with an average diameter of approximately 10 nm, a second population of pores with an average diameter of approximately 50 nm and a third population of pores with an average diameter of between 150-200 nm would be considered to have a multi-modal pore size distribution.

Figure 9:
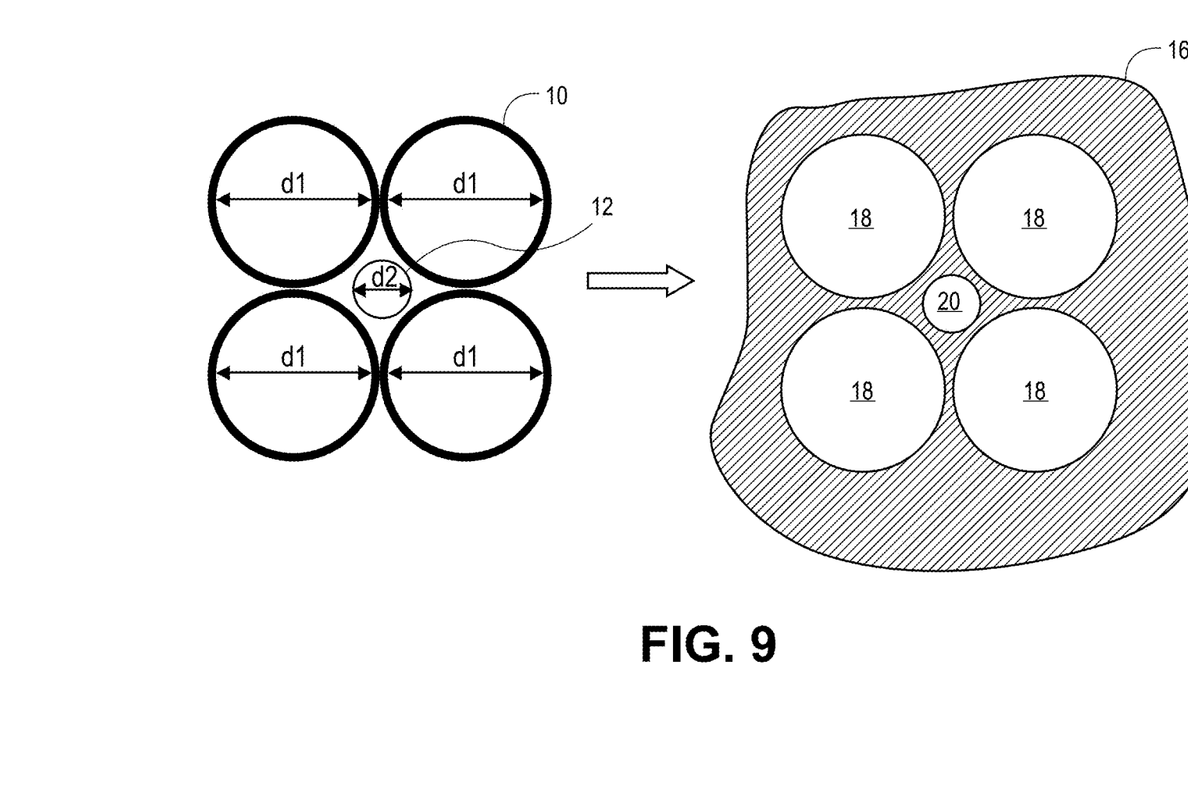
FIG. 9 is a schematic illustration of a method for producing catalysts having a multimodal pore size distribution, as described herein.

Turning to FIG. 9, according to an embodiment, such multi-modal pore size distribution could be produced by templating the above-described precursors onto sacrificial supports formed from spheres (or otherwise shaped particles) having different diameters. As shown, larger spheres 10 having a diameter d1 and smaller spheres 12 having a diameter d2 are mixed together to form a sacrificial support on which the precursor materials are deposited and pyrolized. Once the support is removed, the resulting catalytic material 16 contains differently sized pores 18, 20 corresponding to the different particle diameters.

It will be appreciated that in order to have complete control over the morphology of the resulting catalytic material, it will be desirable to template the precursors into sacrificial supports with known shapes and sizes. According to a particular embodiment where the sacrificial support is formed from silica particles, the different shapes and sizes of sacrificial supports may be produced by using different types of silica to reliably and reproducibly produce differently sized silica particles. The resulting catalysts will then have a multi-modal pore distribution, where the specific size and shape of the pores is known.

After deposition and/or impregnation of the C—N and metal precursors on the sacrificial support, the catalysts is heat treated either in an inert atmosphere such as N$_2$, Ar, or He, or in a reactive atmosphere such as NH$_3$ or acetonitrile. Inert atmospheres are typically used when the C—N precursor is nitrogen rich, as the inert atmosphere enables the production of a high number of active sites with Fe (or other metal) N4 centers. However, it may be desired to use a nitrogen rich atmosphere if the C—N precursor is rich in carbon and depleted in nitrogen, as the nitrogen rich atmosphere will enable production of the Fe (or other metal) N4 centers.

According to an embodiment, optimal temperatures for heat treatment are between 500 and 1100° C. According to some embodiments, heat treatment between 800 and 900° C. is preferred, as this temperature is high enough to pyrolize the material, but is typically not high enough to destroy the active sites.

After heat treatment, the sacrificial support is removed using suitable means. For example, the sacrificial support may be removed via chemical etching. Examples of suitable etchants include NaOH, KOH, and HF. According to some embodiments, it may be preferable to use KOH, as it preserves all metal and metal oxide in the catalyst and, if the species are catalytically active, use of KOH may, in fact, increase catalytic activity. Alternatively, in some embodiments, HF may be preferred as it is very aggressive and can be used to remove some poisonous species from the surface of the catalyst. Accordingly, those of skill in the art will be able to select the desired etchants based on the particular requirements of the specific catalytic material being formed.

Figure 1:
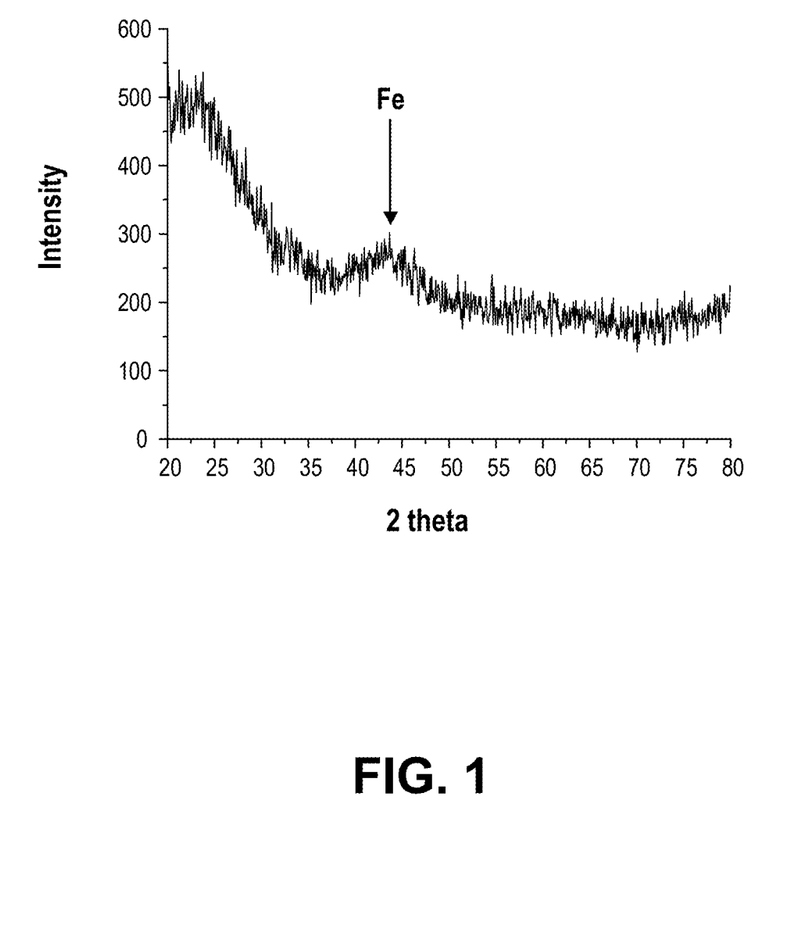
FIG. 1 is an X-ray diffractogram of a Fe-M-C catalyst prepared using the methods described herein.
Figure 2:
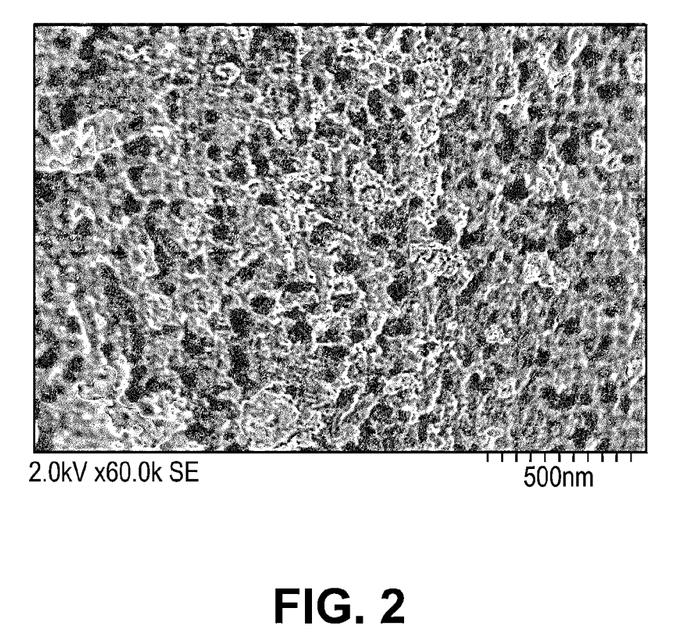
FIG. 2 is an SEM image of Fe-PEI catalysts prepared using the methods described herein.
Figure 3:
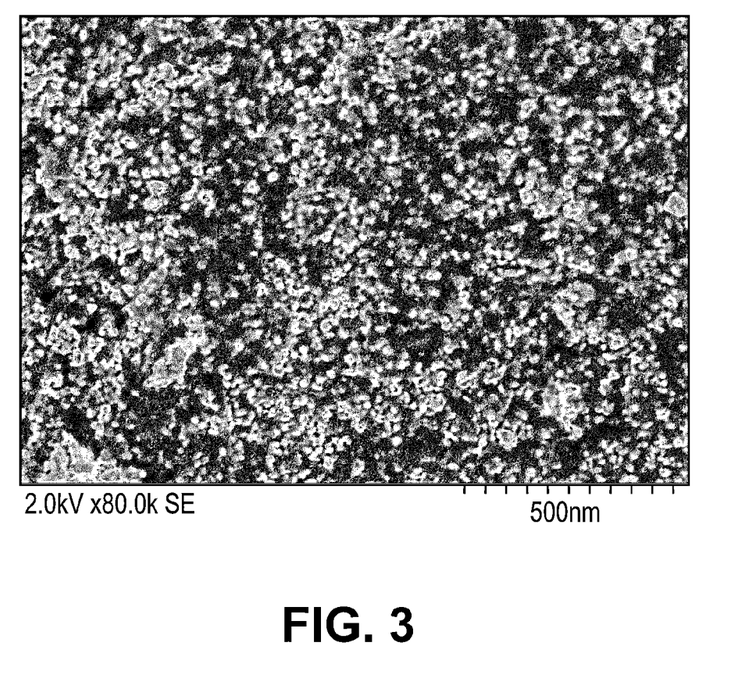
FIG. 3 is an SEM image of Ce-PEI catalysts prepared using the methods described herein.

FIGS. 1-3 illustrate structural and morphological data for selected M-N—C catalysts prepared using the methods described herein.

FIG. 1 is an X-ray diffractogram illustrating that a Fe-M-C catalyst prepared from iron nitrate as a metal source and polyetheleneimine (PEI) as a polymer source of nitrogen and carbon mainly consists of nanoparticles (less than 2 nm) of iron imbedded into carbon matrix.

FIG. 2 is an SEM image of Fe-PEI catalysts prepared using the methods described herein illustrating that this material possesses a highly developed porous structure with pore size of about 40-60 nm. The porosity is thought to improve catalytic properties towards oxygen reduction.

FIG. 3 is an SEM image of Ce-PEI catalysts prepared using the methods described herein illustrating that this material possesses highly developed porous structure with pore size of about 30-40 nm, and that this method yields similar structures to the Fe-PEI even though it uses a different metal. As above, the porosity is thought to improve catalytic properties towards oxygen reduction.

Figure 4:
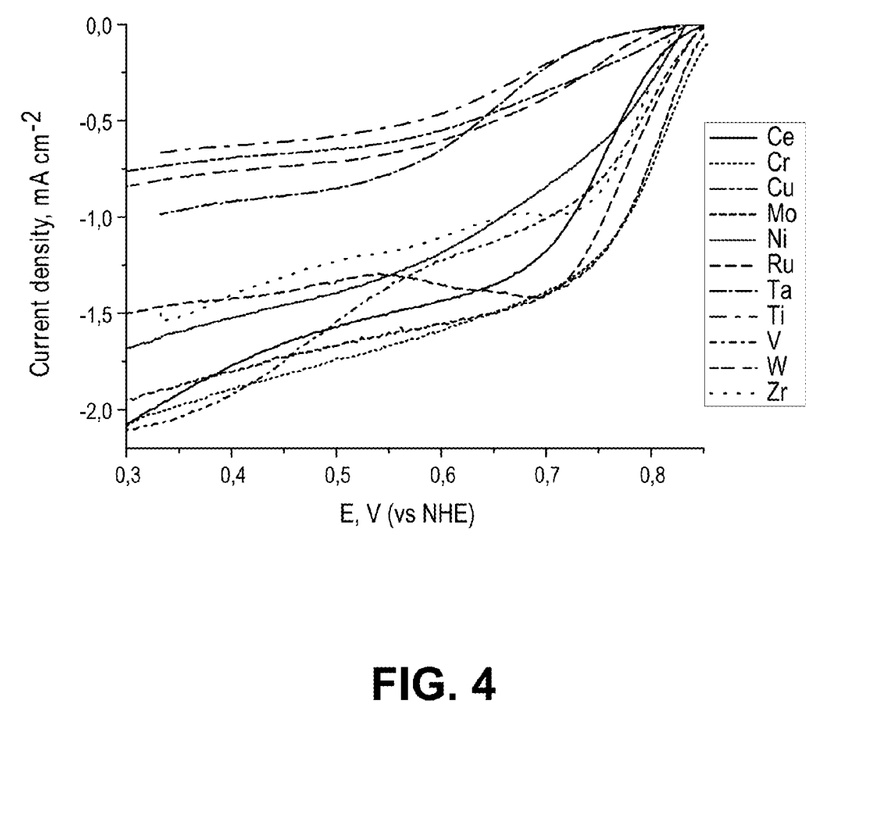
FIG. 4 is a Rotating Disc Electrode electro-voltamogram illustrating oxygen reduction for M-N—C catalysts of the present disclosure.
Figure 5:
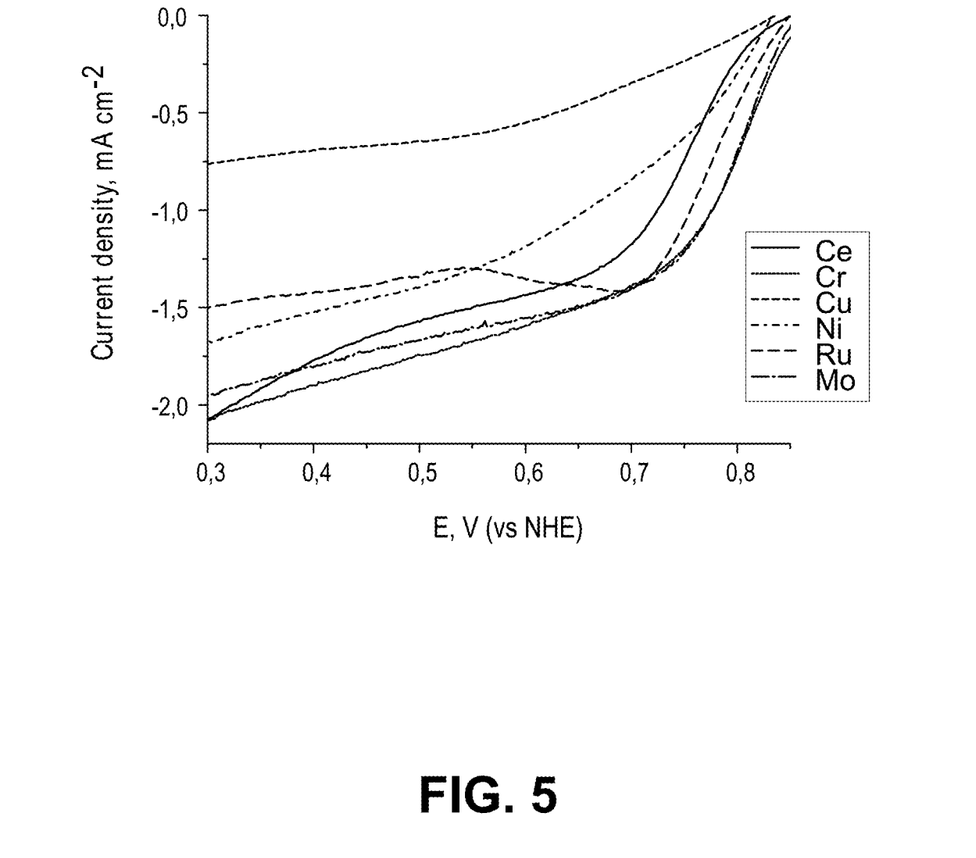
FIG. 5 is a Rotating Disc Electrode electro-voltamogram illustrating oxygen reduction for the most active M-N—C catalysts of FIG. 4.
Figure 6:
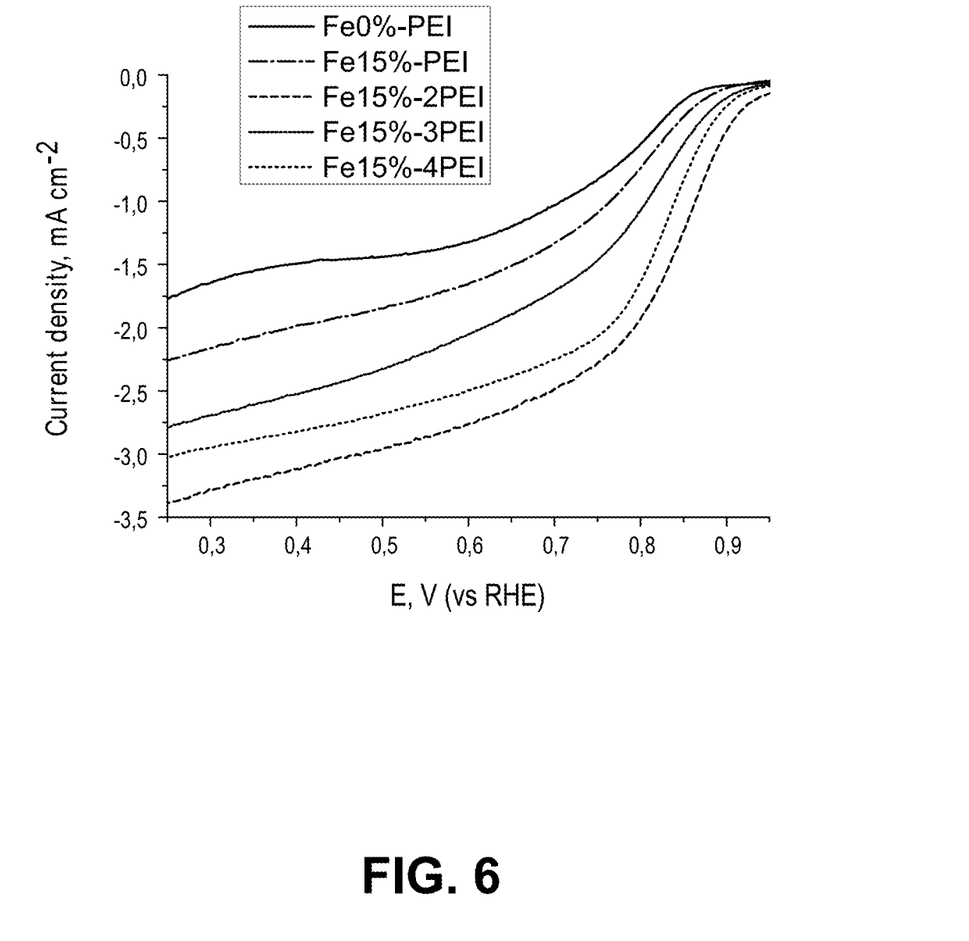
FIG. 6 is a Rotating Disc Electrode electro-voltamogram illustrating oxygen reduction for different Fe-PEI catalysts.

FIGS. 4-6 show the results of oxygen reduction tests and thus demonstrate the utility of the materials described herein.

FIG. 4 is a Rotating Disc Electrode electro-voltamogram illustrating oxygen reduction for M-N—C catalysts where M=Ce, Cr, Cu, Mo, Ni, Ru, Ta, Ti, V, W and Zr and PEI as source of nitrogen and carbon (1M KOH saturated with O$_2$ loading 162 mg cm$^{-2}$, 1600 RPM, scan rate 20 mV cm$^{-1}$).

FIG. 5 is a Rotating Disc Electrode electro-voltamogram illustrating oxygen reduction on the most active catalysts with M=Ce, Cr, Cu, Ni, Ru and Mo with PEI as source of nitrogen and carbon (1M KOH saturated with O2 loading 162 mg cm$^{-2}$, 1600 RPM, scan rate 20 mV cm$^{-1}$).

FIG. 6 is a Rotating Disc Electrode electro-voltamogram illustrating oxygen reduction on different Fe-PEI catalysts prepared with variation of nitrogen contained polymer precursor PEI (1M KOH saturated with O2 loading 162 mg cm$^{-2}$, 1600 RPM, scan rate 20 mV cm$^{-1}$).

These reduction tests demonstrate that the M-N—C catalysts prepared using the methods described herein possess high activity in both alkaline and acid media.

Figure 7:
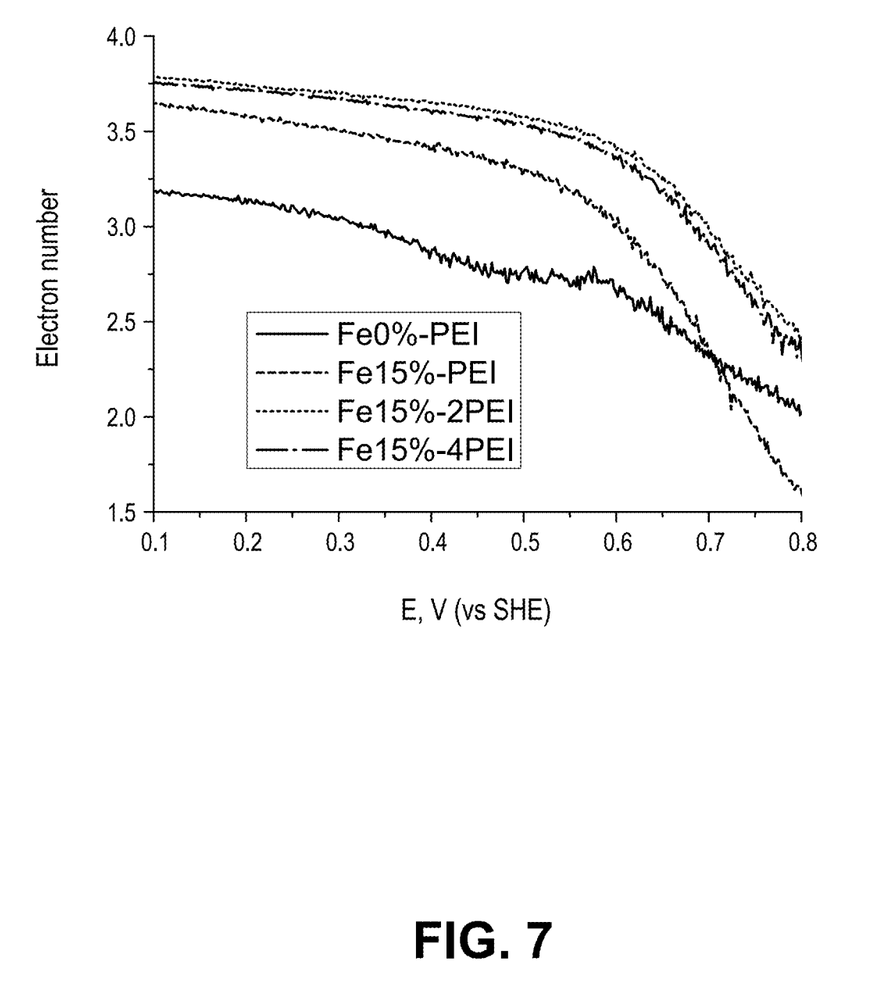
FIG. 7 is a graphical representation of the number of electrons participating in ORR for various Fe-PEI catalysts prepared using the methods described herein.

FIG. 7 is a graphical representation of the number of electrons participating in ORR for Fe-PEI catalysts, with variation of PEI amount obtained by variation of nitrogen-contained precursor amount in 0.5M $H_2SO_4$ saturated with $O_2$ (loading 160 mg cm$^{-2}$, 1600 RPM, 20 mV s$^{-1}$)

Figure 8:
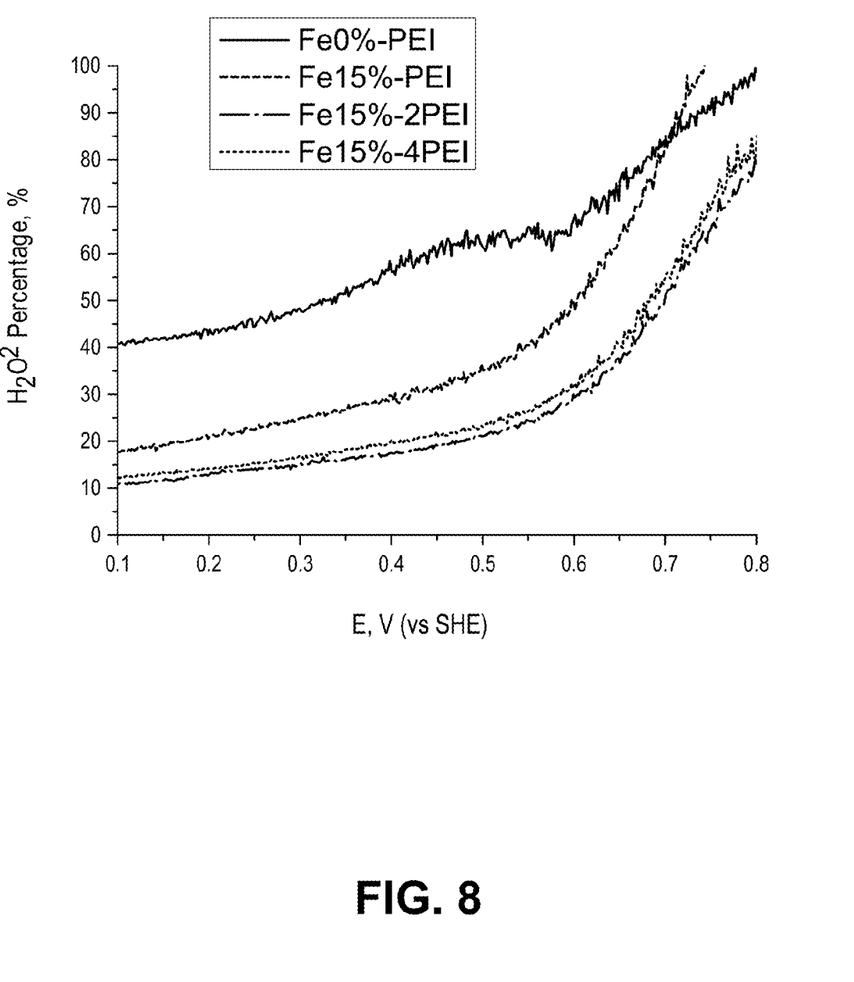
FIG. 8 is a graphical representation of hydrogen yield for various Fe-PEI catalysts prepared using the methods described herein.

FIG. 8 is a graphical representation of hydrogen peroxide yield for Fe-PEI catalysts, with variation of PEI amount obtained by variation of nitrogen-contained precursor amount in 0.5M $H_2SO_4$ saturated with $O_2$ (loading 160 mg cm$^{-2}$, 1600 RPM, 20 mV s$^{-1}$)

The mechanism of oxygen reduction shows the direct reduction of oxygen to water by the 4 electron pathway, thus avoiding corrosive peroxide production and therefore improving the stability and durability of the resulting catalysts.

As demonstrated in FIGS. 6-8, the properties of the resulting catalyst can be varied by selecting the amount of nitrogen-containing precursor to use in the preparation method.

According to embodiment, the M-N—C catalysts described herein can be deposited onto conductive dispersed supports (both carbon and non-carbon) in a fashion that facilitates the charge transfer of the heteroatom atom and the support. Usage of non-carbon support, like conductive Mo or W oxides can significantly decrease hydrogen peroxide production, increasing the durability and stability of catalysts in acid and alkaline media According to some embodiments, it may be desirable to produce large amounts of the catalysts described herein, for example in a batch-wise process. Accordingly, the present disclosure further provides a method for large-scale preparation of the presently described catalysts. According to an embodiment, the present disclosure provides a method which combines a sacrificial support-based methodology with spray pyrolysis to produce self-supported catalysts. According to this method, the spray pyrolysis method is a continuous method while the sacrificial support-based methodology is performed batch-wise. Turning to FIG. 41, it can be seen that the precursor materials described above are mixed with a silica support, atomized, and dried in a tube furnace. The powder obtained from this procedure is then collected on a filter. The collected powder is then heat treated, as needed, depending on the desired application of the catalyst. Finally, the sacrificial support is removed, for example by leaching with HF or KOH.

It will be appreciated that the above-described large-scale production method is suitable for use for a wide variety of precursors and materials and thus not necessarily limited to the catalysts disclosed herein.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. The methods and processes illustratively described herein suitably may be practiced in differing orders of steps, and that they are not necessarily restricted to the orders of steps indicated herein or in the claims. As used herein and in the appended claims, the singular forms "a," "an," and "the" include plural reference unless the context clearly dictates otherwise. Thus, for example, a reference to "a catalyst" includes a plurality of such catalysts, and so forth.

Under no circumstances may the patent be interpreted to be limited to the specific examples or embodiments or methods specifically disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

All patents and publications referenced below and/or mentioned herein are indicative of the levels of skill of those skilled in the art to which the invention pertains, and each such referenced patent or publication is hereby incorporated by reference to the same extent as if it had been incorporated by reference in its entirety individually or set forth herein in its entirety. Applicants reserve the right to physically incorporate into this specification any and all materials and information from any such cited patents or publications.

What is claimed is:

1. A method for producing a Metal-Nitrogen-Carbon catalyst suitable for use in a fuel cell comprising:
providing a sacrificial template;
depositing transition metal and polymer precursors onto the sacrificial template, wherein the polymer precursor is a nitrogen-containing polyelectrolyte with high affinity to negatively charged silica to produce a dispersed precursor;
pyrolyzing the dispersed precursor to produce a M-N—C-sacrificial support composite material; and
removing the sacrificial template to produce a dispersed, self-supported, electrocatalytic material.

2. The method of claim 1 wherein the transition metal precursor is selected from the group consisting of Ce, Cr, Cu, Fe Mo, Ni, Ru, Ta, Ti, V, W, and Zn precursors.

3. The method of claim 2 wherein the transition metal precursor is an iron precursor.

4. The method of claim 3 wherein the iron precursor is iron nitrate.

5. The method of claim 1 wherein the nitrogen-containing polyelectrolyte does not naturally form complexes with iron.

6. The method of claim 5 wherein the nitrogen-containing polyelectrolyte has a graphite-like structure.

7. The method of claim 5 wherein the nitrogen-containing polyelectrolyte is a branch polymer.

8. The method of claim 5 wherein the nitrogen-containing polyelectrolyte forms a complex-like structure with silica due to its own positive charge.

9. The method of claim 5 wherein the nitrogen-containing polyelectrolyte is selected from the group consisting of Polyetheleneneimine, Poly(2-ethyl-2-oxazoline), Poly(acrylamide-co-diallyldimethylammonium chloride), Poly(melamine-co-formaldehyde), and Poly[[6-[(1,1,3,3-tetramethylbutyl)amino]-s-triazine-2,4-diyl]-[(2,2,6,6-tetramethyl-4-piperidyl)imino]-hexamethylene-[(2,2,6,6-tetramethyl-4-piperidyl)imino].

10. The method of claim 5 wherein the nitrogen-containing polyelectrolyte is Polyetheleneneimine.

11. The method of claim 5 wherein the nitrogen-containing polyelectrolyte is Poly(2-ethyl-2-oxazoline).

12. A dispersed, unsupported, catalytic material substantially consisting of nitrogen and carbon from pyrolized nitrogen-containing polyelectrolyte precursors and a transition metal from pyrolyzed metal precursors prepared by the method of claim 1.

13. A dispersed, unsupported, catalytic material substantially consisting of nitrogen and carbon from pyrolized positively charged, nitrogen-containing polyelectrolyte precursor that forms a complex-like structure with silica and does not naturally complex with iron and a transition metal from pyrolyzed metal precursors.

14. The material of claim 13 wherein the nitrogen-containing polyelectrolyte precursors have a graphite-like structure.

15. The material of claim 13 wherein the nitrogen-containing polyelectrolyte precursors are branch polymers.

16. The material of claim 13 wherein the nitrogen-containing polyelectrolyte makes complex-like structure with silica due to its positive charge.

17. The material of claim 13 wherein the nitrogen-containing polyelectrolyte is selected from the group consisting of Polyetheleneneimine, Poly(2-ethyl-2-oxazoline), Poly(acrylamide-co-diallyldimethylammonium chloride), Poly(melamine-co-formaldehyde), and Poly[[6-[(1,1,3,3-tetramethylbutyl)amino]-s-triazine-2,4-diyl]-[(2,2,6,6-tetramethyl-4-piperidyl)imino]-hexamethylene-[(2,2,6,6-tetramethyl-4-piperidyl)imino].

18. The material of claim 15 wherein the nitrogen-containing polyelectrolyte is Polyetheleneneimine.

19. The material of claim 15 wherein the nitrogen-containing polyelectrolyte is Poly(2-ethyl-2-oxazoline).

20. The material of claim 13 wherein the transition metal is selected from the group consisting of Ce, Cr, Cu, Fe Mo, Ni, Ru, Ta, Ti, V, W, and Zn.

* * * * *